United States Patent [19]
Holzer

[11] Patent Number: 5,342,154
[45] Date of Patent: Aug. 30, 1994

[54] HAND MACHINE TOOL WITH TOOL HOLDER

[75] Inventor: Peter Holzer, Solothurn, Switzerland

[73] Assignee: Robert Bosch GmbH, Stuttgart, Fed. Rep. of Germany

[21] Appl. No.: 33,137

[22] Filed: Mar. 18, 1993

[30] Foreign Application Priority Data

Mar. 18, 1992 [DE] Fed. Rep. of Germany ....... 9203627

[51] Int. Cl.⁵ .............................................. B23B 31/02
[52] U.S. Cl. ..................................... 408/240; 279/80; 279/143; 403/327
[58] Field of Search ..................... 279/79, 80, 143–145, 279/158, 89, 90; 408/238, 239 R, 239 A, 240, 241 R; 403/326, 327

[56] References Cited

U.S. PATENT DOCUMENTS

| | | |
|---|---|---|
| 2,258,377 | 10/1941 | Collins ................................ 279/144 |
| 2,397,026 | 3/1946 | Marker et al. . |
| 4,775,269 | 10/1988 | Brix ................................ 408/239 R |
| 4,824,298 | 4/1989 | Lippacher et al. .................. 408/240 |
| 5,180,261 | 1/1993 | Schreiber ........................ 279/145 X |

FOREIGN PATENT DOCUMENTS

| | | |
|---|---|---|
| 746172 | 7/1970 | Belgium . |
| 0265380 | 4/1988 | European Pat. Off. . |
| 1912299 | 3/1965 | Fed. Rep. of Germany . |
| 2545908 | 11/1984 | France . |
| 9103676 | 3/1991 | World Int. Prop. O. . |

*Primary Examiner*—Steven C. Bishop
*Attorney, Agent, or Firm*—Michael J. Striker

[57] ABSTRACT

A hand machine tool has a rotatable spindle having a longitudinal axis and provided with a cone and an annular surface extending at an angle to the longitudinal axis, a tool holder having a conical opening which surrounds the cone, torque-transmitting elements provided between the spindle and the tool holder, and locking elements cooperating with the ring surface of the spindle, the locking elements being formed as spring wire members.

11 Claims, 2 Drawing Sheets

HAND MACHINE TOOL WITH TOOL HOLDER

BACKGROUND OF THE INVENTION

The present invention relates to a hand machine tool with a tool holder.

In particular it relates to a hand machine tool which has a tool holder which is mounted on a rotatable spindle and provided with cutting or opening surrounding a cone and torque transmitting elements cooperating with a clamping ring.

A hand machine tools of the above mentioned general type are known in the art. One of such hand machine tools is disclosed for example in the European patent document EP 265 380 B2. In this reference a polygon-like shaped ring spring is utilized as a locking element. The special shape of the spring reduces the cost of manufacture of the machine and also increases the expenses for tensioning and mounting of the spring.

SUMMARY OF THE INVENTION

Accordingly, it is an object of the present invention to provide a hand machine tool with a tool holder, which avoids the disadvantages of the prior art.

In keeping with these objects and with others which will become apparent hereinafter, one feature of the present invention resides, briefly stated, in a hand machine tool in which the locking elements are formed as spring wire pieces.

When the locking elements are designed in accordance with the present invention, they are simpler to manufacture and to mount. Inexpensively produced spring wire piece is utilized as the locking element and it can be treated by bending.

In accordance with an especially advantageous feature of the present invention, the not clamped free end of the spring wire piece cooperates with a curved path in a handle of the tool holder.

In accordance with another feature of the present invention the annular surface provided on the spindle for cooperation with locking elements can be formed as conically reducing surface or a surface which is perpendicular to the longitudinal axis of the spindle.

The locking elements can be pressed by the clamping ring with their own prestress against the annular surface of the spindle.

The locking elements can be anchored with their one end fixedly in the base body and with their another end can be provided with a clamping arm which cooperates with a curved path in the clamping ring. The curved path can have a recess and an elastic trough.

In accordance with further features of the present invention, the locking elements can be rotatably supported on the base body. They can be bent at the free ends of their clamping arms.

In accordance with still another feature of the present invention the locking elements can pass through passages in a tool holder which extend at an angle to the annular surface, and the locking elements can be guided inclinedly to the treating surface.

Still a further feature of the present invention is that the tool holder can be connected with the spindle in torque transmission by form locking structural elements. They can be arranged on an adaptor provided with a thread for screwing on a conventional drill chuck.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
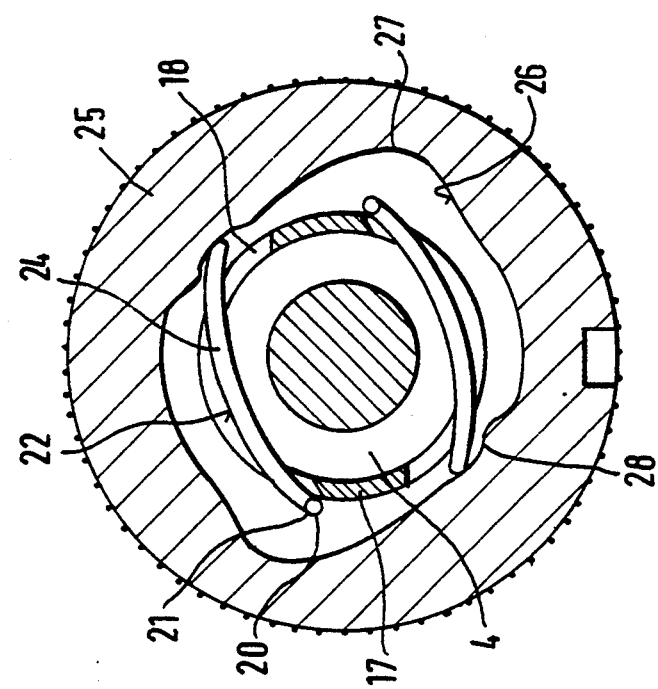
FIG. 1 is a view showing a section taken through a spindle and a tool holder of an inventive hand machine tool.

A hand machine tool in accordance with the present invention can be formed for example as a drilling machine, an impact drilling machine or a hammer drill. From such a machine, only a spindle 2 is shown in the drawings. The spindle 2 has a longitudinal axis 1 and projects forwardly of the housing of the machine. The spindle 2 has a cone which reduces towards its one end, and an oppositely conical reducing ring surface 4. In the region of the greater diameter between the cone 3 and the ring surface 4 the spindle is provided with axially extending depressions 5. A recess 6 can follow the ring surface 4, so that the shaft 7 of the spindle 2 has a greater diameter. The diameter of the spindle 2 can be however maintained identical without the recess. The end of the spindle 2 is provided with a hexagonal bit receptacle 8 for directly inserting helical bits when the hand machine tool operates with a tool receptacle.

A base body 10 of a tool holder or a drill chuck 11 is mountable on the spindle 2. The drill chuck 11 is formed for example as a jaw chuck with adjustable chuck jaws 12. The base body at its end opposite to the chuck jaws 12 has a conical opening 13 which is open toward the spindle 2. The conical opening 13 merges into a cylindrical portion 14 at its end. In the region of transition from the conical opening to the portion 14 an inwardly projecting pin 15 extends in a wall of the base body 10 in an axial direction. The pin 15 is arranged in correspondence with one of the depressions 5 in the spindle 12 and serves for a form-locking torque-transmission of the drill chuck 11 relative to the spindle 3. The spindle-side end of the base body 10 is formed by a collar 17 which has laterally two long passages 18 to the cylindrical portion 14.

Figure 3:
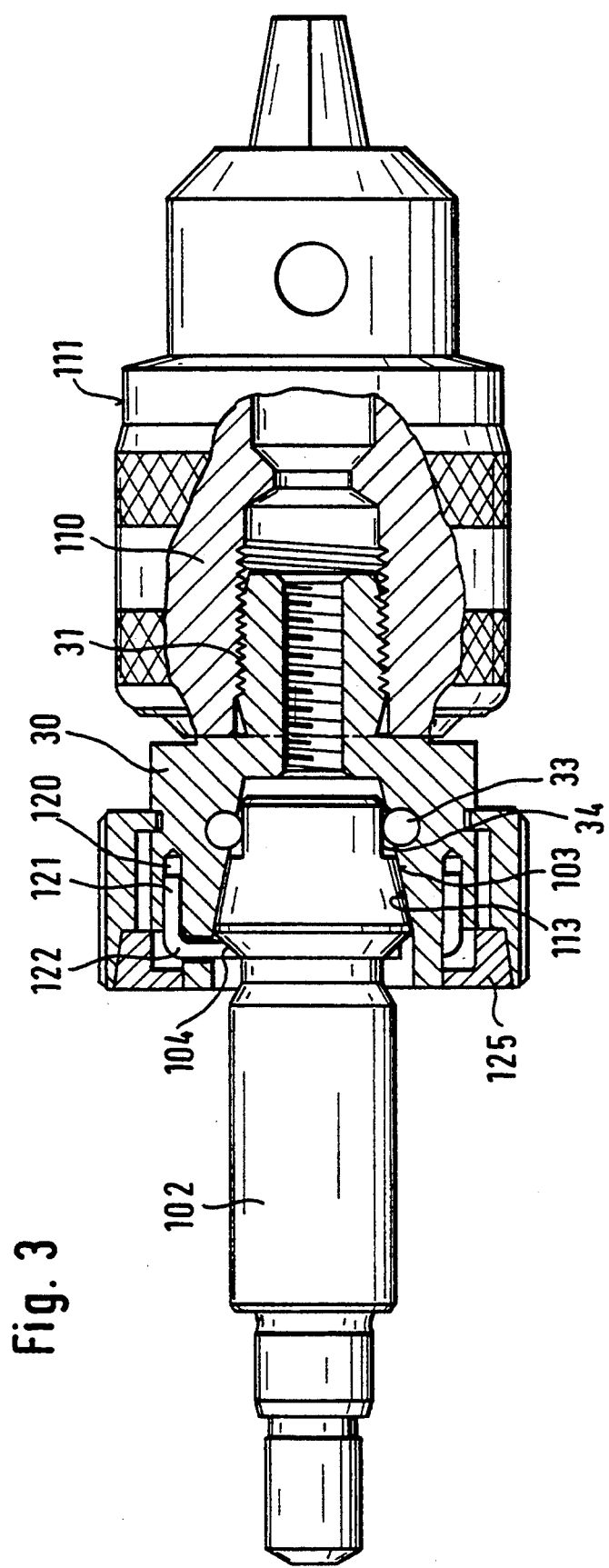
FIG. 3 is a view showing a hand machine tool in accordance with a second embodiment of the invention.

A rear end surface 19 on which the collar is placed has two axially extending blind holes 20 which can be also seen in FIG. 3. An end piece 21 of a spring wire member 22 is inserted in each blind hole 20 and serves as a locking element. After exiting the blind hole 20 the spring wire member 22 is perpendicularly bent and forms a clamping arm 24 extending substantially tangentially to the collar 17. As can be seen from FIG. 1, the spring wire members 22 extend substantially tangentially to the ring surface 4. The end of the clamping arm 24 is bent and abuts against a clamping ring 25. The clamping ring 25 is supported on the base body 10 in axially immovable manner but radially turnable within certain limits. On its inner side which faces the collar 17, the clamping ring 25 has a curved path 26 associated with each of the spring wire members 22. The curved paths 26 have depressions 27 and arresting troughs 28. The clamping ring is knurled on its periphery to facilitate its handling.

With the above described quick exchange device the drill chuck of an impact drilling machine with a handle can be easily connected with the spindle or released from it. For inserting the drill chuck 11, the clamping ring 25 which is located in the viewing direction on the machine, is turned to the left. In this position the spring wire members 22 can be deviated back into the depressions 27 and release the complete cross-section of the cylindrical portion. Since the end pieces 21 are rotatably supported in the blind holes 20 no additional application of force is needed. The drill chuck is centered via the cone 3 and the conical opening 13 relative to the spindle. By the right rotation of the clamping ring 25, the drill chuck is locked. The clamping arms 24 of the spring wire members are tensioned inwardly against the ring surface 4. The cone 3 of the spindle 2 is forced against the conical opening 13 of the drill chuck 11. The drill chuck 11 is connected with the spindle so that it is fixedly and reliably centered. The torque-transmission of the drill chuck is ensured by the pin 15 which engages in the depression 5. For dismounting the drill chuck it suffices to turn the clamping ring 25 to the left and to withdraw the drill chuck 11. Another drill chuck can also be utilized or a helical bit can be arranged directly in the bit receptacle 8.

The second embodiment shown in FIG. 3 differs from the first embodiment in that the coupling elements cooperating with the spindle 2 are arranged on an adaptor 30 which has a thread 31 for screwing of a conventional drill chuck. Structural elements of the second embodiment which correspond to the structural of the first embodiment are identified with similar numbers increased by 100. Two pins 33 are inserted tangentially in the region of the conical opening 111 for torque-transmission of the adaptor 30. Two flattenings 34 provided on the cone 103 abut against the pins.

Figure 2:
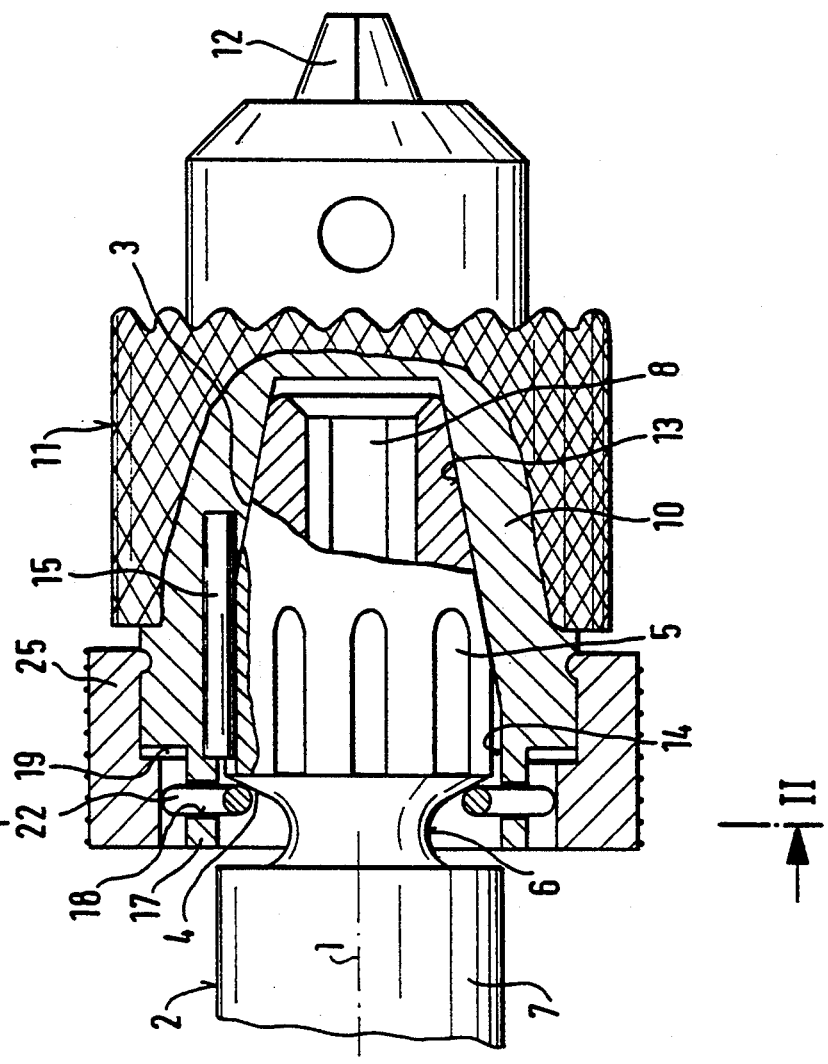
FIG. 2 is a view showing a section taken along the line II—II in FIG. 1.

In accordance with a further, not shown, example, the ring surface on the spindle extends perpendicularly to its longitudinal axis and not conically. For applying a clamping force by the locking elements to the cone of the spindle, they are guided in the passages of the base body of the drill chuck, which passages extend at an angle of for example 45° inclinedly to the ring surface. By turning the clamping ring, the locking elements are inclinedly moved together with it forwardly on the ring surface, and therefore as with the conical shape of the ring surface a clamping force which increases with increasing rotary angle is produced. The remaining elements of this embodiment correspond to the elements of the embodiments of FIGS. 1 and 2.

It will be understood that each of the elements described above, or two or more together, may also find a useful application in other types of constructions differing from the types described above.

While the invention has been illustrated and described as embodied in a hand machine tool with tool holder, it is not intended to be limited to the details shown, since various modifications and structural changes may be made without departing in any way from the spirit of the present invention. Especially elements of the first element and the second embodiment of the invention can be combined with one another.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A hand machine tool, comprising a rotatable spindle having a longitudinal axis and provided with a cone and a ring surface extending at an angle to said longitudinal axis; a tool holder having a conical opening which surrounds said cone; torque-transmitting elements provided between said spindle and said tool holder and formed as form-locking elements which connect said tool holder with said spindle for torque-transmission therebetween; and locking means separate from said torque-transmitting elements and cooperating with said ring surface of said spindle exclusively for locking said tool spindle, said locking means being formed as spring wire members.

2. A hand machine tool as defined in claim 1, wherein said ring wire members engage said ring surface of said spindle, and said ring surface of said spindle is formed as a conically reducing surface.

3. A hand machine tool as defined in claim 1, wherein said ring wire members engage said ring surface of said spindle, and said ring surface of said spindle extends substantially perpendicularly to said longitudinal axis of said spindle.

4. A hand machine tool as defined in claim 1, wherein said tool has a base body, said locking means having at least one locking arm which is radially turnably supported in said base body.

5. A hand machine tool as defined in claim 1, wherein said spring wire members extend substantially tangentially to said ring surface.

6. A hand machine tool, comprising a rotatable spindle having a longitudinal axis and provided with a cone and a ring surface extending at an angle to said longitudinal axis; a tool holder having a conical opening which surrounds said cone; torque-transmitting elements provided between said spindle and said tool holder; locking means cooperating with said ring surface of said spindle, said locking means being formed as spring wire members; and a rotatable clamping ring which acts on said locking means.

7. A hand machine tool as defined in claim 6, wherein said locking elements are pressable by said clamping ring against said ring surface of said spindle under its own prestress.

8. A hand machine tool as defined in claim 6, wherein said tool holder has a base body, said clamping ring has a curved path, said locking means including a locking element which has one end radially fixedly anchored in said base body of said tool holder and another end provided with a clamping arm cooperating with said curved path of said clamping ring.

9. A hand machine tool as defined in claim 8, wherein said curved path for said locking element has a depression and an arresting trough.

10. A hand machine tool, comprising a rotatable spindle having a longitudinal axis and provided with a cone and a ring surface extending at an angle to said longitudinal axis; a tool holder having a conical opening which surrounds said cone; torque-transmitting elements provided between said spindle and said tool holder; locking means cooperating with said ring surface of said spindle, said locking means being formed as spring wire members; a form-locking structural element which connects said tool holder with said spindle for torque-transmission therebetween; and an adaptor having a thread for screwing a conventional drill chuck, said structural elements being mounted on said adaptor and cooperating with said spindle.

11. A hand machine tool, comprising a rotatable spindle having a longitudinal axis and provided with a cone and a ring surface extending at an angle to said longitudinal axis; a tool holder having a conical opening which surrounds said cone; torque-transmitting elements provided between said spindle and said tool holder; and locking means cooperating with said ring surface of said spindle, said locking means being formed as spring wire members, said tool holder having passages through which said locking means pass, said passages running under an angle on said ring surfaces of said spindle and leading said locking means inclinedly on said ring surface.

* * * * *